United States Patent Office 3,513,064
Patented May 19, 1970

3,513,064
COMPOSITE POLYFLUOROCARBON
SHEET MATERIAL
Melvin W. Westley, Trumbull, Conn., assignor to E. I.
du Pont de Nemours and Company, Wilmington, Del.,
a corporation of Delaware
No Drawing. Filed Apr. 27, 1966, Ser. No. 545,567
Int. Cl. C09j 3/14; D03d 15/10
U.S. Cl. 161—92
9 Claims

ABSTRACT OF THE DISCLOSURE

There is disclosed a composite sheet material having utility as a flexible and durable fluorine-resistant garment material for those who handle missile fuels and the like. The flexible sheet material comprises a polytetrafluoroethylene (PTFE) fabric having on at least one side:

(A) a layer of a cured fluoroelastomer (e.g. a VF/HFP copolymer) adhered to the fabric, and (B) an impervious layer of fluoropolymer (e.g., a TFE/HFP copolymer) adhered to layer (A).

---

This invention relates to a new and useful flexible composite sheet material adapted for use in the manufacture of protective clothing to be worn by persons handling fluorine-containing missile fuels and other extremely reactive chemicals.

Previously known sheet materials are not entirely satisfactory for use as a fluorine-resistant garment material because they lack the desired fluorine-resistance, flexibility and/or resistance to damage by flexing and scrubbing. The missile industry and other industries which use or manufacture fluorine and fluorine-containing compositions are in need of a garment material having not only good resistance to fluorine but also good flexibility, heat resistance and durability including resistance to premature cracking or other damage when repeatedly flexed or scrubbed). Methods known in the art for testing the flex resistance and scrub resistance of polymeric sheet materials are described below.

In a broad sense, the flexible sheet material of the present invention comprises a polytetrafluoroethylene fabric having on at least one side (A) a layer of a cured fluoroelastomer in adherent contact with said fabric and selected from copolymers containing about 30 to 70% by weight of vinylidene fluoride units and about 70 to 30% by weight of hexafluoropropene units, and terpolymers containing about 97 to 65% by weight of vinylidene fluoride and 3 to 35% by weight of tetrafluoroethylene units and hexafluoropropene units, the vinylidene fluoride/hexafluoropropene weight ratio being about 70/30 to 40/60, and (B) an impervious layer of fluoropolymer in superposed adherence with (A) consisting essentially of a copolymer of about 50 to 95% by weight tetrafluoroethylene and about 50 to 5% by weight of a fluoroolefin having the formula $CF_2=CFY$ wherein Y is a $C_1$ to $C_8$ perfluoroalkyl radical.

When the product is to be used as a protective clothing material, the polytetrafluoroethylene (PTFE) fabric is preferably a woven fabric weighing about 4 to 6 ounces per square yard having a thread count warp x filler) of about 35 x 35 to about 60 x 60. Other PTFE fabrics are also useful in the practice of this invention. A fabric is used which (a) is constructed loosely enough to permit satisfactory adhesion of the fluoroelastomer coating, and yet (b) is constructed tightly enough to provide satisfactory resistance to distortion and tearing.

The PTFE fabric is preferably impregnated with the fluoroelastomer and it is preferably coated on both sides with the fluoroelastomer so that the product has an impervious layer of the cured fluoroelastomer on both side (surfaces) of the fabric. The cured fluoroelastomer layer (layer A) on each side of the fabric preferably weighs about 4 to 12 ounces per square yard. Layer A can be deposited from a fluid coating composition or from a preformed film.

When the fabric is coated on both sides with the fluoroelastomer layer A, the product of this invention can have the fluoropolymer layer B on both surfaces. This construction is sometimes preferred; for example, to insure that fluorine or the like will not pass through a garment made from the novel sheet material even if the outer layer is accidentally cut or otherwise damaged.

The fluoroelastomer of layer A is a copolymer of vinylidene fluoride and hexafluoropropene, a terpolymer of vinylidene fluoride, hexafluoropropene and tetrafluoroethylene, or a mixture of these two polymers. One preferred fluoroelastomer is a copolymer of about 30 to 70% by weight of vinylidene fluoride and about 70 to 30% by weight of hexafluoropropene. A procedure for preparing this type of copolymer is described in "Industrial and Engineering Chemistry" 49, 1687 (1957).

Another preferred fluoroelastomer is a terpolymer of about 3 to 35% by weight of tetrafluoroethylene and about 97 to 65% by weight (total) of vinylidene fluoride and hexafluoropropene units, the vinylidene fluoride:hexafluoropropene weight ratio being about 7:30 to 40:60. A procedure for preparing this type of terpolymer is described in U.S. Pat. 2,968,649.

Methods well known in the art of coating fabrics with elastomer coating compositions can be used for blending the fluoroelastomer with a curing agent and other compounding agents, and for applying the resulting fluoroelastomer composition to the fabric. For example, the compounding, coating and curing procedures described in U.S. Pat. 3,025,185 can be employed in the preparation of layer A in the sheet material of the present invention. The fluoroelastomer layer is preferably cured after layer B is placed in superposed contact with it in order to obtain the best possible adhesion.

Layer B is preferably (but not necessarily) a preformed impervious film of the fluoropolymer which is given an adhesion-enhancing treatment on the surface to be adhered to layer A before the layers are bonded together in a heated press. A particularly useful adhesion-enhancing treatment for the layer B film is described in claim 1 of copending (allowed) U.S. patent application Ser. No. 318,149, filed Oct. 21, 1963 now U.S. Pat. 3,274,089 wherein the film surface is subjected to an electrical discharge in the presence of a suitable vapor, for example a mixture of vaporized glycidyl methacrylate and nitrogen. The treated surface of the film is preferably coated with a thin layer of epoxy resin and/or the fluoroelastomer of layer A before it is bonded to the elastomer-coated fabric.

Layer B consists essentially of a copolymer containing about 50 to 95% by weight of tetrafluoroethylene units and about 50 to 5% by weight hexafluoropropene or other suitable fluoroolefin having the formula $CF_2=CFY$ wherein Y is a $C_1$ to $C_8$ perfluoroalkyl radical. Fluoropolymers of this type are described in U.S. Pats. 2,833,686, 2,946,763 and 3,085,083. An especially useful fluoropolymer for the preparation of layer B is a tetrafluoroethylene/hexafluoropropene copolymer prepared according to the thermal stability-improving process described in claim 6 of U.S. Pat. 3,085,083 and having (1) a "specific melt viscosity" of about 4 to $6 \times 10^5$ poises at 380° C. as defined in U.S. Pat. 3,085,083, column 5, lines 18–32 and (2) a "specific I.R. (infra red) ratio of about 3.0 to 4.5 as defined in U.S. Pat. 2,946,763, column 2, lines 1–28. As is known in the art, the proportion of units derived from hexafluoropropene present in the copolymer is directly proportional to the specific I.R. ratio.

Sheet materials are obtainable in accordance with the present invention which are sufficiently fluorine-resistant, flexible, heat-resistant and durable to be useful for the manufacture of protective clothing for persons exposed to fluorine and the like at ordinary ambient temperatures or at elevated temperatures. Sheet materials of the present invention have an unexpected combination of desirable properties including outstanding resistance to fluorine-containing missile fuels and surprisingly good resistance to cracking or other damage when worn by the user or when subjected to known scrub and flex tests. Sheet materials of the present invention are also useful for the manufacture of chemical and heat-resistant diaphragms, fuel cells and protective coverings for various types of instruments and apparatus.

The examples which follow are given for the purpose of illustrating the invention. All quantities shown are on a weight basis unless otherwise indicated.

EXAMPLE 1

A flexible sheet material having outstanding utility as a fluorine-resistant garment material is prepared as follows.

A woven PTFE fabric consisting essentially of PTFE fibers is provided having a weight of 5.1 ounces per square yard, a thread count (warp x filler) of 42 x 40 and a thickness of 9.5 mils (0.0095 inch); the fabric has been heat set at 249° C. (fabric type T–12 from Stern and Stern Textiles, Inc.).

The fabric is impregnated and coated with a fluoroelastomer composition prepared according to Formula 1.1:

Formula 1.1

| | Parts |
|---|---|
| Fluoroelastomer 60/40 | 20.90 |
| Magnesium oxide | 3.06 |
| Carbon black MT (medium thermal) | 10.50 |
| Tacky fluoroelastomer | 2.72 |
| N,N'-dicinnamylidene-1,6-hexanediamine ("Diak" No. 3) | 1.05 |
| Toluene | 28.37 |
| Methylisobutyl ketone | 33.40 |
| | 100.00 |

Fluoroelastomer 60/40 is a copolymer containing about 60% by weight of vinylidene fluoride units and about 40% by weight of hexafluoropropene units, it has an inherent viscosity (0.1 gram of copolymer in 100 cc. of an 87/13 weight percent tetrahydrofuran//dimethylformamide mixture) at 30° C. of about 0.95, a Mooney viscosity (ML 10 at 100° C.) of about 75 and a number average molecular weight of about 100,000; it is prepared according to the general procedure described in "Industrial and Engineering Chemistry" 49, 1687 (1957).

The tacky fluoroelastomer in Formula 1.1 is a vinylidene fluoride/hexafluoropropene copolymer prepared by the procedure described in U.S. Pat. 3,069,401, Example 9 (composite material of part B) and having a Brookfield viscosity at 90° C. of about 400 cps. when tested after the second hour of processing as described in said Example 9.

The Formula 1.1 composition is prepared by mixing the first four ingredients on a 2-roll rubber mill, and then blending the resulting mixture with the solvents in which the diamine curing agent has previously been dissolved.

The solution composition of Formula 1.1 is applied to the fabric by (a) immersing the fabric in the composition until the fabric is impregnated therewith, (b) passing the impregnated fabric through the nip of a pair of squeeze rolls so that the fabric retains 1.1 ounces per square yard (dry basis) of the composition, (c) drying the impregnated fabric in an oven at 82° C., (d) passing the impregnated fabric through a conventional doctor-knife-over-roll coating apparatus to apply a coat (1.3 ounces per square yard, dry basis) of the composition to one side of the fabric, (e) drying the coated material in an oven at 99° C. and (f) repeating steps (d) and (e) to apply a like coating of the composition to the other side of the fabric. The resulting fluoroelastomer-impregnated and coated fabric contains 3.7 ounces per square yard (dry basis) of the Formula 1.1 composition.

Next, the impregnated and coated sheet material is calender-coated on both surfaces with a fluoroelastomer composition prepared according to Formula 1.2:

Formula 1.2

| | Parts |
|---|---|
| Fluoroelastomer 45/30/25 | 69.40 |
| Lead oxide | 10.43 |
| Carbon black MT | 17.36 |
| Lead stearate | 0.70 |
| "Diak" No. 3 (diamine curing agent) | 2.11 |
| | 100.00 |

The fluoroelastomer in Formula 1.2 is a terpolymer containing about 45% vinylidene fluoride units, 30% hexafluoropropene units and 25% tetrafluoroethylene units; it is prepared by the general procedure described in Example 6 of U.S. Pat. 2,968,649 except slightly different proportions of reagents are obviously used. The Formula 1.2 composition is prepared by mixing the first four ingredients on a 2-roll rubber mill, and then blending the resulting mixture with the diamine curing agent on a rubber mill immediately prior to the calender-coating step.

A layer of the Formula 1.2 calender coating composition weighing 8.2 ounces per square yard is applied to each surface of the previously impregnated and solution-coated sheet material by means of a 3-roll calender whose rolls are at a temperature of about 82° C.

A fluorine-impervious preformed fluoropolymer film is provided for application to one surface of the calender-coated sheet material. This is a 5-mil thick film which was prepared by melt extrusion from a tetrafluoroethylene/hexafluoropropene copolymer, the copolymer having been made by the thermal stability-improving process described in U.S. Pat. 3,085,083 and characterized by a specific melt viscosity of about $5 \times 10^5$ poises at 380° C. and a specific I.R. ration of about 3.8. This preformed film is given an adhesion-enhancing treatment by (a) subjecting one surface of the film to an electrical discharge in the presence of a mixture of glycidyl methacylate and nitrogen under the conditions described in Example 1 of the above-mentioned U.S. Pat. application Ser. No. 318,149, (b) spray-coating the surface treated in step (a) with a thin layer (two grams per square meter, dry basis) of a methyl ethyl ketone solution of an epoxy resin ("Epon" No. 1004, which is described in U.S. Pat. 2,825,702) and drying the coating in a heat zone, and (c) applying to the epoxy resin-coated surface a thin coating (0.7 ounce per square yard, dry basis) of the fluoroelastomer composition of Formula 1.1 followed by drying the coating in a heat zone.

The resulting fluoropolymer film (layer B) is placed in superposed contact with one surface of the above-described calender-coated sheet material so that the treated surface of the film contacts the fluoroelastomer coating of the coated fabric, and the film is integrally bonded to the coated fabric by means of heat and pressure. The bonding of the film to the coated fabric and the simultaneous curing of the fluoroelastomer is accomplished by (1) passing the assembled materials through a rotary-type heated press (with the film in contact with the rotating drum of the press) wherein the assembly is subjected to a pressure of about 35 p.s.i. at a temperature of about 171° C. for about nine minutes, (2) heating the resulting composite sheet material in an oven at about 177° C. for one hour and (3) heating the sheet material in an oven at about 204° C. for two hours, the cure of the fluoroelastomer layer A being completed in steps 2 and 3. The rotary press is of the type described in U.S. Pat. 2,039,271 wherein the sheet material is pressed and heated in the moving pressure zone formed by looping an endless steel band under tension about a major portion of the cylindrical surface of a rotatable heated steel drum for movement therewith along an arcuate path.

The product of Example 1 is a flexible and susprisingly durable composite sheet material having a high degree of fluorine resistance, a thickness of 22 mils, a weight of 34 ounces per square yard, good tensile strength and tear strength, good adhesion between the various layers of the composite structure, and a Schildtknecht flex resistance of at least 10,000 cycles in both the warp and fill directions. The apparatus for measuring Schildtknecht flex resistance is described in Bulletin No. 105 published by Alfred Suter, 200 Fifth Avenue, New York, N.Y. The result is given as the number of flexing cycles required to cause noticeable damage (e.g., cracking or delamination) to the product.

The unexpected durability of the product of this example is further demonstrated by the well-known "hand scrub test." This severe test, which indicates how well a coated fabric will withstand wear and abuse, is performed by grasping the ends of a 2-inch by 4-inch sample between the thumbs and forefingers and vigorously rubbing the layer B surface of the sheet material back and forth upon itself under pressure while maintaining the sample in an S-shaped loop. The product of this sample shows no apparent cracking or delamination of the coating layers or other damage to the composite structure after 10,000 such back-and-forth rubbing cycles ("scrubs"). Thus, the product has a scrub resistance value of more than 10,000.

The scrub resistance of this product is remarkably high in comparison with the 40 to 50 scrub resistance value obtained with a representative prior art composite fluoropolymer sheet material used for manufacturing protective clothing to be worn by persons handling fluorine-containing missile fuels and the like, said sheet material being prepared by hot-press-laminating a preformed 5-mil thick film of a tetrafluoroethylene/hexafluoropropene (85/15) copolymer to a woven PTFE fabric (thread count 80 x 80) at a temperature slightly above the softening point of the copolymer.

The scrub resistance of the Example 1 product is also tested on a mechanical scrub tester of the type described in "Automotive Industries," vol. 49, No. 25, pp. 1262–1266 (Dec. 20, 1923). The weighted rider resting on the sample during this test weighs 380 grams, and the tester operates at 110 cycles per minute. The mechanical scrub test simulates the conditions of the hand scrub test described above. The scrub resistance of the product when tested in this manner is also more than 10,000.

EXAMPLE 2

A flexible sheet material which is useful as a fluorine-resistant garment material is prepared by repeating Example 1 except (a) the PTFE fabric has a thread count of 80 x 80 and a thickness of 5.5 mils (type T–83 from Stern & Stern) and (b) the preformed fluoropolymer film is made from a tetrafluoroethylene/hexafluoropropene copolymer prepared according to the procedure described in Example 1 of U.S. Pat. 2,946,763. The product of Example 2 has a scrub resistance of at least 1,000.

EXAMPLE 3

A flexible sheet material which is more useful as a fluorine-resistant garment material than the product of Example 2 but less than the product of Example 1 (when scrub resistance is a major factor) is prepared by repeating Example 2 except the PTFE fabric is identical to the fabric employed in Example 1. The product of Example 3 has a scrub resistance of at least 2,000.

I claim:
1. A flexible sheet material adapted for use as a fluorine-resistant garment material comprising a polytetrafluoroethylene fabric having on at least one side
  (A) a layer of a cured fluoroelastomer in adherent contact with said fabric and selected from the group consisting of copolymers containing about 30 to 70% by weight of vinylidene fluoride units and about 70 to 30% by weight of hexafluoropropene units, and terpolymers containing about 3 to 35% by weight of tetrafluoroethylene units and about 97 to 65% by weight of vinylidene fluoride and hexafluoropropene units, the vinylidene fluoride/hexafluoropropene weight ratio being about 70/30 to 40/60, and
  (B) an impervious layer of fluoropolymer in superposed adherence with (A) consisting essentially of a copolymer of about 50 to 95% by weight tetrafluoroethylene and about 50 to 5% by weight of a fluoroolefin having the formula $CF_2=CFY$ wherein Y is a $C_1$ to $C_8$ perfluoroalkyl radical;
  at least the portion of layer A that is in adherent contact with layer B having undergone curing while in contact with layer B.
2. A sheet material according to claim 1 wherein said fluoroolefin is hexafluoropropene.
3. A sheet material according to claim 2 having said layer (A) on both sides of said fabric.
4. A sheet material according to claim 3 having said layer (B) on both sides of the product.
5. A sheet material according to claim 3 having a scrub resistance of at least 2,000.
6. A sheet material according to claim 2 wherein said fabric is impregnated with said cured fluoroelastomer.
7. A sheet material according to claim 2 wherein said fabric has a weight of about 4 to 6 ounces per square yard and a thread count of about 35 x 35 to about 60 x 60.
8. A sheet material according to claim 2 wherein layer (B) is a preformed film of said fluoropolymer whose layer (A)-contacting surface has the adhesion-enhancing characteristics which result from subjecting said surface to an electrical discharge in a gaseous atmosphere containing a vapor of an organic agent.
9. A sheet material according to claim 8 wherein said fluoropolymer is the product of a thermal stability-improving process which provides it with a specific melt viscosity of about 4 to $6 \times 10^5$ poises at 380° C. and a specific I.R. ratio of about 3.0 to 4.5.

References Cited

UNITED STATES PATENTS

| | | | |
|---|---|---|---|
| 3,274,089 | 9/1966 | Wolinski | 204—165 |
| 3,085,083 | 4/1963 | Schreyer | 260—87.5 |
| 3,025,185 | 3/1962 | Schmidt | 117—68 |
| 2,983,624 | 5/1961 | Thompson | 117—68 |
| 2,968,649 | 1/1961 | Pailthorp | 161—189 |
| 2,946,763 | 7/1960 | Bro et al. | 260—87.5 X |

J. STEINBERG, Primary Examiner

M. A. LITMAN, Assistant Examiner

U.S. Cl. X.R.

161—95, 189; 117—138.8; 156—309